United States Patent Office 3,171,318
Patented Mar. 2, 1965

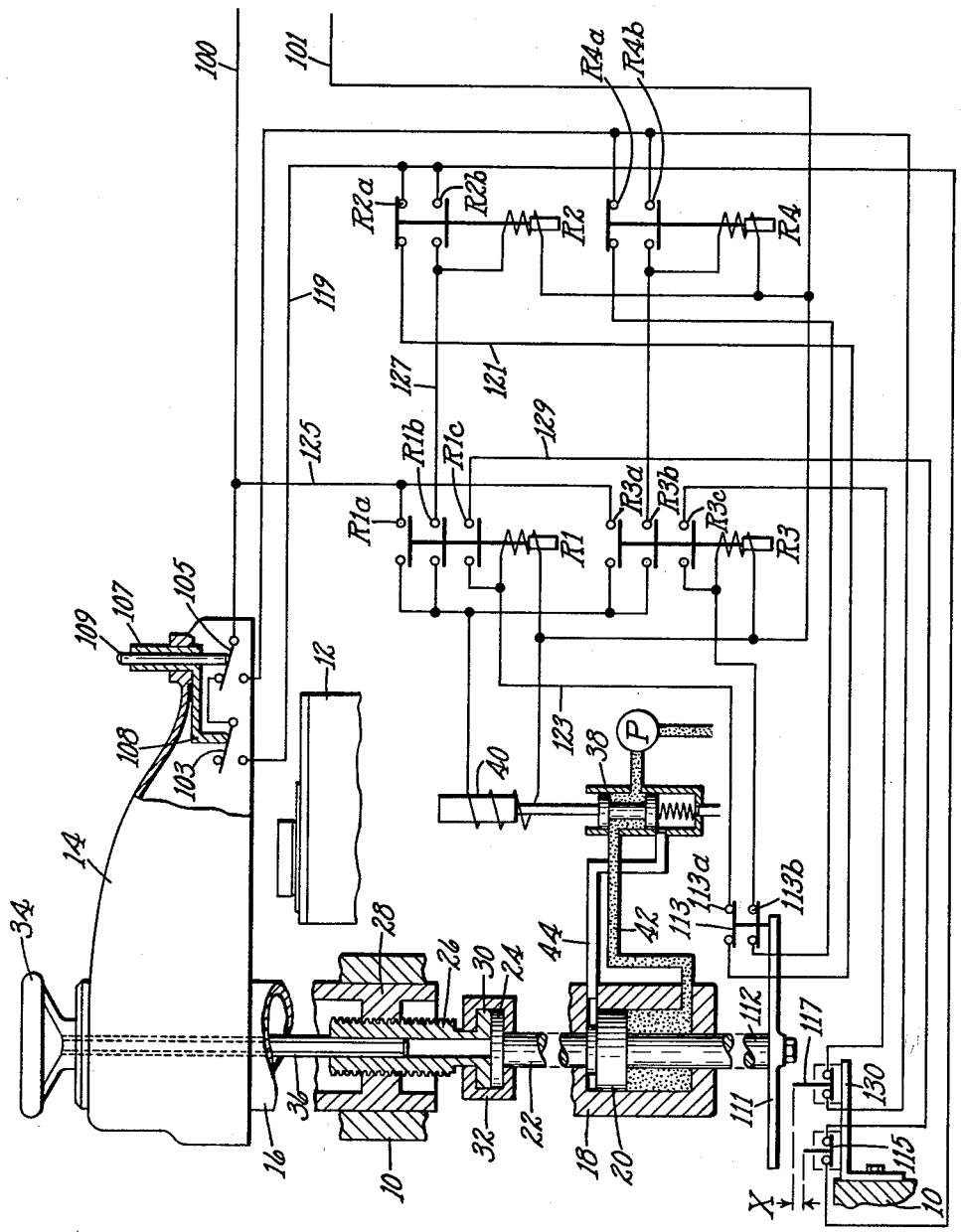

3,171,318
CUTTING PRESS HAVING CONTROL FOR INITIATING CUTTING STROKES OF DIFFERENT LENGTHS
Anton Muhlbach, Frankfurt am Main-Sossenheim, Germany, assignor to United Shoe Machinery Corporation, Boston, Mass., a corporation of New Jersey
Filed May 15, 1961, Ser. No. 110,118
Claims priority, application Germany, May 18, 1960, D 33,376
2 Claims. (Cl. 83—530)

This invention relates to improvements in cutting presses of the type commonly known as clickers. More particularly, the invention relates to improvements in cutting stroke controls for such presses whereby an operator, in initiating a cutting stroke of the press, may conveniently select one of a plurality of lengths of cutting strokes to accommodate different cutting situations.

Cutting presses of the clicker type comprise generally a frame, a work support fixed to the frame, a platen mounted on a vertically movable column for swinging over the support, and power means for moving the platen toward the support in cutting strokes. Such presses have heretofore also been provided with stroke terminating means comprising a limit switch carried by the press and actuated by a member moved by the power means as it moves the column and platen. In the absence of strain, the position of this member thus reflects the position of the platen so that the limit switch will be actuated for terminating the stroke at a predetermined position of the platen at the bottom of the cutting stroke.

However, the pressure required to be exerted by the platen in cutting varies in accordance with the size of the die as measured in linear inches so that a relatively large die requires substantially greater pressure than relatively smaller dies of the same height. Accordingly, bending strains in the frame, column and platen are greater with the larger dies. Consequently, where the limit switch has been adjusted for suitable termination of the stroke using a particular die, if a substantially larger die is then used, the stroke will be terminated before proper cutting because such strains distort the relation between the positions of the platen and the actuating member for the limit switch.

On this account it was necessary to make suitable adjustments, such as hand wheel adjustments of platen height, between cuts when changing to a different size die or else to put up with driving smaller dies deeply into the cutting block.

Another problem was caused by irregularities of the cutting surface through wear, as, for example, where the center of the cutting surface becomes dished through greater use than outer portions. With such a surface condition, if the stroke terminating control is adjusted for proper cutting with a die placed on an unworn relatively high portion of the cutting surface, when the same die is used over a worn portion of the surface, the cut will be incomplete unless again a suitable adjustment is made.

Accordingly, an object of the present invention is to provide in a cutting press of the foregoing type stroke control means which will reduce the need for between-stroke adjustments by the operator to meet the aforesaid problems.

Another object of the invention is the provision of a stroke control by the use of which, by suitable manipulation of stroke initiating means, the operator may select one of a plurality of stroke lengths to accommodate different cutting situations.

Another object of the invention is to provide in such presses a stroke control by which the stroke length selection and stroke initiation may simultaneously be performed by the operator with one hand.

Another object of the invention is to provide in such presses a stroke control by which the stroke initiating and length selecting means comprises a handle also adapted for swinging the platen over the support.

To this end and in accordance with a feature of the invention there is provided in a cutting press comprising a work support, a platen, and power means for moving the platen toward the support in cutting strokes, a stroke control comprising a plurality of manually movable members adapted to be moved by the operator with one hand to obtain selective stroke lengths, each member being arranged upon movement thereof to operate the control to initiate a cutting stroke of predetermined length at the end of which the stroke will be automatically terminated.

As illustrated, the manually movable members comprise a handle also adapted for swinging the platen, and a push rod movable vertically within the handle and normally projecting slightly from the top thereof whereby the operator may conveniently depress either the handle with his fingers or the push rod with his thumb. The handle and push rod are each arranged for individual actuation of a different one of two trip switches operative to initiate the cutting stroke and to connect operatively into the stroke control one of two limit switches adapted to be actuated at different positions of a power driven member relative to the frame to terminate the stroke. Actuation of one trip switch connects one limit switch for control of the stroke termination while actuation of the other trip switch connects the other limit switch.

Other features and advantages of the invention will best be understood from the following description taken together with the accompanying drawing in which the single figure comprises a diagram of the operating elements of the press together with a schematic of the electric stroke control circuit.

The figure illustrates diagrammatically a press comprising a frame 10, a work support 12 attached to the frame and a platen 14, mounted on a column 16 slidable vertically in the frame 10, for swinging over the support 12. Power means comprising a hydraulic cylinder 18 and a piston 20 is provided for moving the column 16 and platen 14 heightwise of the work support 12. The piston 20 is connected to the column 16 through a shaft 22 having a flanged portion 24 at its upper end and coupled to a screw 26 having external threads mating with internal threads in a web portion 28 of the column. The screw 26 is formed with a lower flanged portion 30 similar in size to the portion 24, the two flanged portions 24 and 30 being held together in relatively rotatable relation by a coupling 32. A hand wheel 34 rotatably mounted at the top of the column 16 is fast to a hexagonal rod 36 vertically slidable in a hexagonal hole in the screw 26 so that the column 16 may be raised or lowered relative to the piston 20 by rotation of the hand wheel 34 for adjustment of the position of the platen 14.

Fluid for operating the power means is supplied by a pump P through a valve 38 having a solenoid 40 operatively connected to the valve to cause it to admit fluid from the pump either through a conduit 42 to the cylinder 18 below the piston as shown, or, when the solenoid 40 is energized, through a conduit 44 to the cylinder 18 at the upper side of the piston 20 to cause the piston to be moved downwardly, together with the column and the platen, in a cutting stroke.

The stroke control is shown connected to electric power supply lines 100 and 101, and in accordance with the present invention, comprises a pair of single pole double throw trip switches 103 and 105, shown with upper and lower contacts, and actuating means therefor comprising a handle 107 mounted for vertical movement in the platen 14 and having an arm 108 arranged for actuation of the switch 103 by such movement, and a push rod 109 extending through the handle 107, one end normally protruding slightly above the handle while the lower end is arranged for actuation of the trip switch 105 when the rod 109 is depressed. The stroke control also comprises four relays R1, R2, R3 and R4, an actuating disc 111 connected to the piston 20 through a rod 112, a two pole normally open switch 113 held closed by the disc 111 only when the piston 20 is at the upper end of the cylinder and two normally closed single pole limit switches 115 and 117 arranged to be opened individually by movement of the disc 111 to two different positions relative to the frame 10.

In operation, depressing the handle 107 actuates the switch 103 by transferring the switch arm to its lower contact. Thereupon a conductive path is formed from the line 100 through the upper contact of the switch 105, the lower contact of the switch 103, a lead 119, contacts R2a of the relay R2, contacts 113a of the switch 113, through the coil of the relay R1 and to the power supply line 101, thus energizing the relay R1 to effect closure of its contacts R1a, R1b, and R1c.

Closure of the contacts R1a energizes the solenoid 40 from the line 100 through a lead 125, the contacts R1a, the coil of the solenoid 40 to the line 101. Closure of the contacts R1b forms a circuit from the line 100 through the lead 125, the contacts R1a, the contacts R1b, through the lead 127 to the coil of the relay R2, and to the line 101 causing the relay R2 to transfer its contacts and form a holding circuit for the relay R1 including the contacts of the limit switch 115 while bypassing the switch 103. This holding circuit path extends from the line 100 through the lead 125, the contacts R1a, the contacts R1b, the lead 127, the contacts R2b to the lead 119 and through the contacts of the switch 115 and the contacts R1c to the coil of the relay R1. Energization of the solenoid 40 causes the valve 38 to admit fluid under pressure through the conduit 44 while opening the conduit 42 to an exhaust. Fluid pressure then causes the piston 20 to move downwardly in a cutting stroke carrying with it the disc 111. As the disc 111 moves away from the switch 113, the contacts 113a and 113b are opened, the opening of the contacts 113b preventing energization of the relay R3 should the push rod 109 be depressed. Downward movement of the disc 111 continues until it engages and actuates the switch 115 to open its contacts upon which the holding circuit for the relay R1 is broken and it drops out, deenergizing the solenoid 40 and, if the trip switch 103 is open, the relay R2. The electric circuit then is restored to its illustrated condition while fluid is admitted to the cylinder 18 beneath the piston 20 to return the platen to its upper position. If the switch 103 is held closed by the operator, the relay R2 remains energized, the open contacts R2a preventing "repeat" of the press when the contacts 113a close.

The stroke length provided by initiating the cutting stroke by depressing the handle 107 is used for large dies i.e., those having a large linear length, this being the basic adjustment. When the operator uses a small die or a die positioned over a high portion of the cutting surface, he initiates the stroke by depressing the push rod 109 to actuate the switch 105. This forms a circuit from the line 100 through the lower contact of the switch 105, through the contacts R4a, the contacts 113b to the relay R3. The relay R3 then closes its contacts energizing the solenoid 40 and the relay R4. Transfer of the contacts of the relay R4 sets up a holding circuit for the relay R3 through the limit switch 117 in the same manner as described above for the other channel comprising the relays R1 and R2. Accordingly, when the disc 111 moves downwardly sufficiently to actuate the limit switch 117 to open its contacts, the cutting stroke is terminated and the platen returned to its starting position. This will occur at a higher position of the disc 111 than where the stroke was initiated by depressing the handle 107, this difference in position being indicated in exaggerated form by the dimension X.

It will be noted that the arms of the switches 103 and 105 are connected in series to the line 100 so that should both the handle 107 and the push rod 109 be depressed simultaneously, the switch 103 is disconnected from the line 100 and only one channel comprising the relays R3 and R4 is energized.

The stroke lengths provided by the limit switches 115 and 117 may be simultaneously varied by adjusting the height of a bracket 130 on which the two switches are mounted. Adjustment of the heightwise position of the switches and adjustment of the height of the platen with respect to the column by turning the hand wheel 34 are, of course, interdependent in establishing the lowermost position of the platen in its cutting stroke. Suitably, the operator will first set the hand wheel adjustment so that the platen in its upper position just clears the die when upon the work and then sets the position of the switches 115 and 117 so that the length of the cutting strokes provides proper cutting.

Having thus described my invention, what I claim as new and desire to secure by Letters Patent of the United States is:

1. In a cutting press having a frame, a work support fixed to the frame, a platen supported for movement toward and away from the support, and power means for moving the platen toward the support in cutting strokes for pressing dies through work pieces on the support, in combination therewith, control means operatively connected to the power means and comprising a plurality of stroke trip switches mounted on the platen, a corresponding plurality of manually movable members mounted on the platen for actuation of each of the trip switches by movement of the corresponding member, power controlling means comprising a solenoid connected to the power means for control thereof to cause the power means to move the platen toward the support when the solenoid is energized, an actuating member connected to the power means for movement thereby in accordance with the movement of the platen by the power means, switch means mounted on the frame for actuation by said actuating member when in an initial position with the platen at the top of its stroke, a plurality of limit switches arranged for actuation by said actuating member at different positions thereof corresponding to different stroke lengths, relay means controlled by said plurality of trip switches and operative upon actuation of each trip switch selectively to connect one of said limit switches in a holding circuit for said relay means, said switch means being operative upon movement of said actuating member from its initial position to render the trip switches inoperative further to affect the relay means, the selected one of said limit switches being operative upon actuation thereof by the actuating member to interrupt the holding circuit for said relay means and thereby effect deenergization of the solenoid to terminate the cutting stroke.

2. In a cutting press having a frame, a work support fixed to the frame, a platen supported for movement toward and away from the support, and power means for moving the platen toward the support in cutting strokes for pressing dies through work pieces on the support, in combination therewith, a stroke control comprising in combination, a solenoid arranged when energized to cause the power means to move the platen toward the support, two stroke trip switches mounted on the platen, two limit switches arranged for actuation by the power means at different positions of the platen, first relay means controlled by one of said start switches for energizing said solenoid and for establishing a holding circuit for said relay means through one of said limit switches in response to actuation of said one start switch, second relay means controlled by the other of said start switches for energizing said solenoid and for establishing a holding circuit for said relay means through the other of said limit switches in response to actuation of said other start switch, and circuit means connecting said trip switches and operative to prevent simultaneous actuation of said trip switches from operating both said first and said second relay means.

References Cited in the file of this patent
UNITED STATES PATENTS

| | | |
|---|---|---|
| 2,543,759 | Cannon | Mar. 6, 1951 |
| 2,818,922 | Stratton | Jan. 7, 1958 |